Aug. 19, 1958 H. E. ROYS ET AL 2,848,556

MAGNETIC RECORDING TRANSDUCER

Filed Aug. 2, 1954

INVENTORS.
Dallas R. Andrews
& Henry E. Roys

BY Morris L. Rabkin
ATTORNEY.

United States Patent Office 2,848,556
Patented Aug. 19, 1958

2,848,556

MAGNETIC RECORDING TRANSDUCER

Henry E. Roys, Haddon Heights, and Dallas R. Andrews, Collingswood, N. J., assignors to Radio Corporation of America, a corporation of Delaware Application August 2, 1954, Serial No. 447,240

The terminal fifteen years of the term of the patent to be granted has been disclaimed 5 Claims. (Cl. 179—100.2)

This invention relates to the art of magnetic recording, and more particularly to an improved magnetic record transducer.

Magnetic recording techniques have been employed in the design of high-speed automatic computers. In such computers, information is frequently recorded as a plurality of pulses aligned transversely of the direction of motion of a moving tape record member. In an effort to minimize the occurrence of errors due to imperfections in the tape and the like, heads have been designed in which the data is recorded in duplicate channels. Such a transducer is shown in an application of W. Saeger, Ser. No. 352,081, for Pulse Recording on Magnetic Tape, filed April 30, 1953, now U. S. Patent No. 2,689,274. However, in that case the head units corresponding to the several channels are all aligned transversely of the direction of motion of the tape. Thus the head may be susceptible to errors arising from a fault which coincides with the aligned heads. Such a fault might be a crease or splice in the tape.

An object of this invention is to provide an improved multiple channel magnetic record transducer which obviates the foregoing difficulties.

It is another object of this invention to provide a transducer as set forth wherein the individual head units are staggered in a direction transverse to the direction of motion of an associated record tape and wherein all of the head units have a common flux return path member.

A further object of this invention is to provide a transducer as set forth wherein means are provided for eliminating the tendency of the introduction of cross-talk by the use of the common return path member.

In accomplishing these and other objects, there has been provided, in accordance with the present invention, a multiple channel transducer having a plurality of head units. Each of the head units comprises a core member having a signal coil thereon and means defining a magnetic return path. A signal gap is defined where the core member abuts the return path defining means. The return path defining means comprises a single member made of a suitable magnetic material and of a size sufficient to embrace all of the head units, providing a magnetic return path for said head units. A short-circuited turn of conductive material surrounds the return path member between each pair of adjacent head units. The head units are arranged with alternate core members on opposite sides of the return path member.

A better understanding of the present invention may be had from the following detailed description when read in connection with the accompanying drawing, in which, Fig. 1 is a schematic representation of a plan view of a transducer embodying the present invention;

Figure 1:
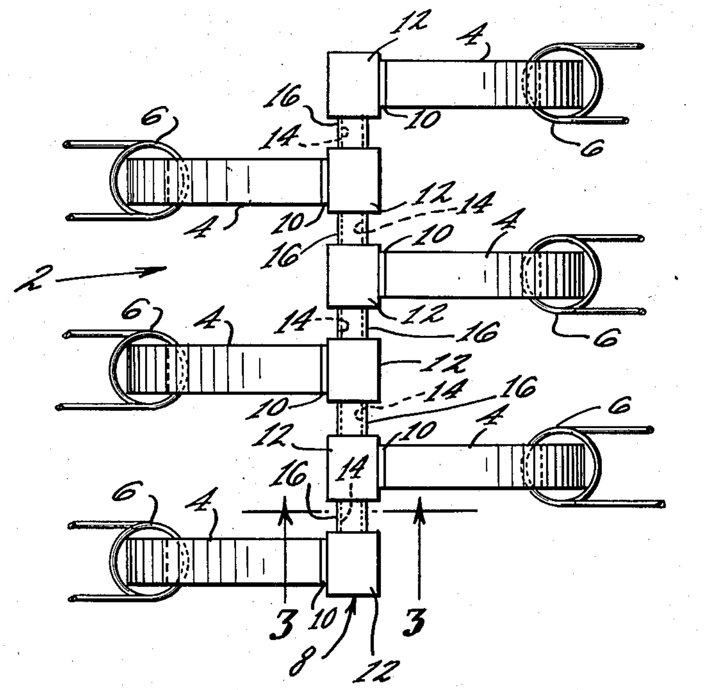
Figure 2:
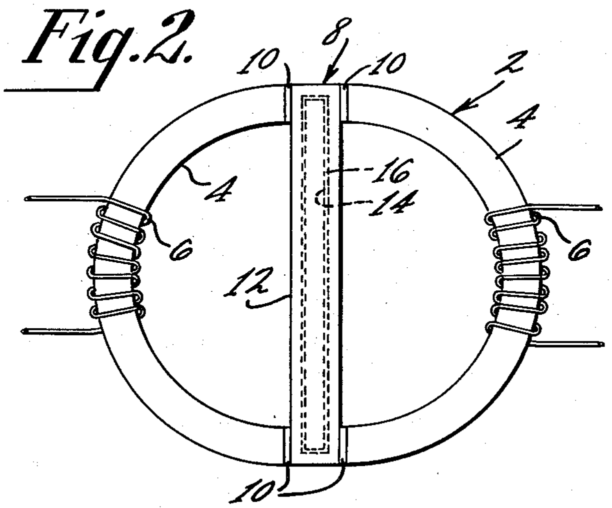
Fig. 2 is an end view of the structure shown in Fig. 1.
Figure 3:
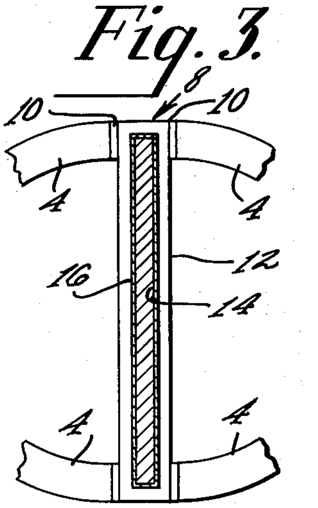
Fig. 3 is a cross-sectional view taken along the line 3—3 of Fig. 1 and viewed in the direction of the arrows.

Referring to the drawing in more detail there is shown, schematically, a transducer 2 which includes a plurality of head units. Each head unit comprises a core member 4, a signal coil 6 on each of the core members, and means defining a magnetic return path. The means defining the magnetic return path for the core members 4 comprises a sheet 8 of suitable magnetic material such, for example, as mu-metal. This sheet 8 is a size which is large enough to serve as a return path member for all of the several core members 4.

In the illustrated embodiment of the invention, there are six head units, the core members 4 of three of them are on one side of the sheet 8, while the core members 4 of the other three head units are on the opposite side of the sheet member 8. Where each of the core members meets or abuts the surface of the sheet member, a signal translating gap 10 is formed and defined. Any of the usual means for establishing the gap may be employed. For example, thin pieces of a suitable conductor such as copper may be inserted between the ends of the core members 4 and the return path means 8.

With alternate ones of the core members 4 on opposite sides of the sheet member 8, the signal gaps 10, instead of falling in the usual straight line, form two parallel straight lines. These two lines are separated by the thickness of the sheet member 8.

Assuming, as in the aforesaid Seager application, that identical data is applied to two of the head units simultaneously, if the gap 10 of one of the head units is on one side of the sheet 8 while the gap 10, in the other head unit is on the opposite side of the sheet, the occurrence of a transverse fault such as a crease or splice in the tape will not pass both head units simultaneously. Consequently, the transverse fault will not give rise to an error since one or the other of the two head units will be in a position to translate the signal free from the influence of the fault.

Since the return path member 8 is a unitary member, its dimension can be carefully controlled. The uniformity of the thickness dimension is of particular importance if a record member is to be used interchangeably among several transducers.

To prevent, or at least minimize, any tendency of the common return means 8 from introducing cross-talk between the several head units, special steps are taken. The sheet member 8 is allowed to remain at its predetermined thickness in the areas 12 constituting the flux return paths of the several head units. However, in the spaces between adjacent head units, a groove 14 is formed by any suitable means as by milling, for example. In the groove 14 thus formed, a conductive member 16 is placed and constitutes a short-circuited turn. The conductive member 16 may be a copper plating, a wire, or other suitable arrangements. Any magnetic flux, particularly high frequency flux, tending to flow from one channel to the other will produce a short-circuited electric current in the conductive member 16. Following the physical laws relating to the conservation of energy, the electric current results in a magnetic field opposing the original field or flux. The effect is that of an extremely high magnetic impedance to the flux which would tend to cause cross-talk. In the face of the high impedance, the flux is constrained to the relatively low impedance path of the several head units.

There has thus been provided an improved transducer for multiple channel magnetic tape records in which errors due to transverse faults in the tape are substantially eliminated and means are provided to prevent the occurrence of cross-talk between the several channels.

What is claimed is:

1. A magnetic record transducer comprising a plurality of head units, each of said head units including a core member, a signal coil mounted on said core member and a magnetic flux return path member, said magnetic flux return path member being common to all of said head units, means defining signal gaps between each of said core members and said common flux return path member, said head units being arranged with adjacent gaps on opposite sides of said common return path member, and means associated with said common return path member providing a high magnetic impedance to transverse flux between adjacent head units, said last named means including a conductive member for establishing in response to said transverse flux a flux in opposition thereto.

2. A magnetic record transducer comprising a plurality of head units, each of said head units including a core member, a signal coil mounted on said core member and a magnetic flux return path member, said flux return path member being common to all of said head units, means defining signal gaps between each of said core members and said common flux return path member, said head units being arranged in transversely spaced array with said signal gaps of adjacent ones of said head units lying on opposite sides of said common flux return path member, and closed loops of conductive material disposed around said common flux return path member in the space between adjacent ones of said head units providing a high magnetic impedance to transverse flux between adjacent head units.

3. A magnetic record transducer comprising a plurality of head units, each of said head units including a core member, a signal coil mounted on said core member and a magnetic flux return path member, said flux return path member being common to all of said head units, means defining signal gaps between each of said core members and said common flux return path member, said head units being arranged in transversely spaced array, and means associated with said common flux return path member providing a high magnetic impedance to transverse flux between adjacent head units, said last named means including a conductive member for establishing in response to said transvere flux a flux in opposition thereto.

4. A magnetic record transducer comprising a plurality of head units, each of said head units including a core member, a signal coil mounted on said core member and a magnetic flux return path member, said flux return path member being common to all of said head units, means defining signal gaps between each of said core members and said common flux return path member, said head units being arranged in transversely spaced array with said signal gap of adjacent ones of said head units lying on opposite sides of said common flux return path member, and means constituting a short-circuited conductor around said common flux return path member between adjacent ones of said head units whereby to provide a high magnetic impedance to transverse flux between said head units through said common flux return path member.

5. A magnetic record transducer comprising a plurality of head units, each of said head units including a core member, a signal coil mounted on said core member and a magnetic flux return path member, said flux return path member being a unitary member common to all of said head units, means defining signal gaps between each of said core members and said common flux return path member, said head units being arranged in transversely spaced array with said signal gaps of adjacent ones of said head units on opposite sides of said common flux return path member, said common flux return path member having a groove formed around it between adjacent ones of said head units, and a short-circuited conductor in each of said grooves whereby to provide a high magnetic impedance to transverse flux between said head units through said common flux return path member.

References Cited in the file of this patent

UNITED STATES PATENTS 2,700,588 Williams -------------- Jan. 25, 1955